United States Patent [19]

Ferren

[11] Patent Number: 5,023,724
[45] Date of Patent: Jun. 11, 1991

[54] FOCUS ENHANCING METHOD

[76] Inventor: Bran Ferren, 615 Fireplace Rd., East Hampton, N.Y. 11937

[21] Appl. No.: 356,427

[22] Filed: May 24, 1989

[51] Int. Cl.⁵ .................................... H04N 5/225
[52] U.S. Cl. .................................... 358/227; 358/226
[58] Field of Search ............... 358/227, 225, 209, 231, 358/60, 226

[56] References Cited

U.S. PATENT DOCUMENTS

| | | | |
|---|---|---|---|
| 4,584,704 | 4/1986 | Ferren | 358/227 |
| 4,591,918 | 5/1986 | Hisano | 358/226 |
| 4,695,893 | 9/1987 | Makino et al. | 358/227 |
| 4,907,024 | 3/1990 | Takahashi | 358/227 |

Primary Examiner—Stephen Brinich
Attorney, Agent, or Firm—Darby & Darby

[57] ABSTRACT

A method for enhancing the high frequency information of an object being viewed by a video camera, to detect edges and object detail more accurately by projecting a preselected optical pattern onto the surface of the object. As the spatial plane of the camera travels through the object space, the projected pattern follows, always remaining in focus with the moving plane. The sharp detail of the pattern adds to the high frequency information read by the camera when the viewed object comes into focus and peaks when the object is in focus.

3 Claims, 3 Drawing Sheets

FOCUS ENHANCING METHOD

FIELD OF THE INVENTION

This invention pertains to a method for enhancing the detectability of objects in three dimensional space and for improving the range resolution thereof.

BACKGROUND OF THE INVENTION

Objects, when scanned with a video camera (Vidicon for example) provide a wide range of signal frequencies which vary depending on the features and detail of the object. Any sharp in-focus features of an object, such as edges, corners and detailed texture produce high frequency signals whereas an object or portions of an object which are featureless, such as smooth planer surfaces with no edges or corners, give rise to signals of lower frequencies or even direct current signals.

A known method to help determine when an object being recorded by a video camera is in focus uses a high pass electronic filter to isolate the higher frequencies. When the lens of the camera is focused, the level of the total maximum high frequency energy of the object also varies. From a camera's view, the sharper (more in-focus) the detailed features of an object, the higher the level of high frequency energy. This level is measured and when it peaks, the detail of the object will be its sharpest and the object will therefore be as well focused as possible with respect to the video camera. This technique of using high frequencies to determine the focus status of an object is described in U.S. Pat. No. 4,584,704 issued Apr. 22, 1986.

The U.S. Pat. No. 4,584,704 discloses a spatial imaging system which uses a video camera and other electronics to distinguish objects of various shape lying within the camera's field of vision. A focal plane of shallow depth is periodically swept from a near to far range by a focus sweep servo so that different thin planes of the field of vision will be in focus at successive time intervals during the sweep. The video camera scans (in a conventional manner) the focal plane at each position, thereby producing a plurality of two dimensional images at successively different ranges. Each of these images will only sharply present the object in focus if the object (or part of it) lies in the plane at which the lens is focused. The location of any object detail (as determined by the scan lines) of these 2-D images on these planes will yield high frequency peaks. Since the position of each two dimensional image (or plane) is known, an image map of the three dimensional object can be reproduced and the object accurately identified. However, if there is no (or little) surface or edge detail on all or portions of the object then the video images of such portions will provide little or no high frequency information even when they are in focus. In such cases, the shape of the 3-D object may not be accurately reproduced and, therefore, inaccurately identified.

There are other methods for detecting shapes of 3-D objects involving the use of projected structured light patterns. By projecting a grid pattern at a ball, for example, and studying the deformations of the lines of the grid, the spherical shape may be approximated. These systems are not accurate for distinguishing similarly shaped objects and require an observer. It is therefore an object of the present invention to provide an improved method of focus detection for use with a spatial imaging system as disclosed in U.S. Pat. No. 4,584,704 whereby a projected pattern always remains in focus with the focal plane of the video camera to enhance the high frequency component, thereby providing object identification more easily and more accurately.

A general object of the present invention is to provide a method for focus detection using a video camera or other detector.

A more specific object of the present invention is to provide an improved method for focus detection using a video camera (or other detector) by projecting a defined pattern onto the surface of an object to enhance a selected frequency component, thereby permitting the selected frequency peak detection more easily and more accurately.

DETAILED DESCRIPTION OF THE INVENTION

Figure 1A:
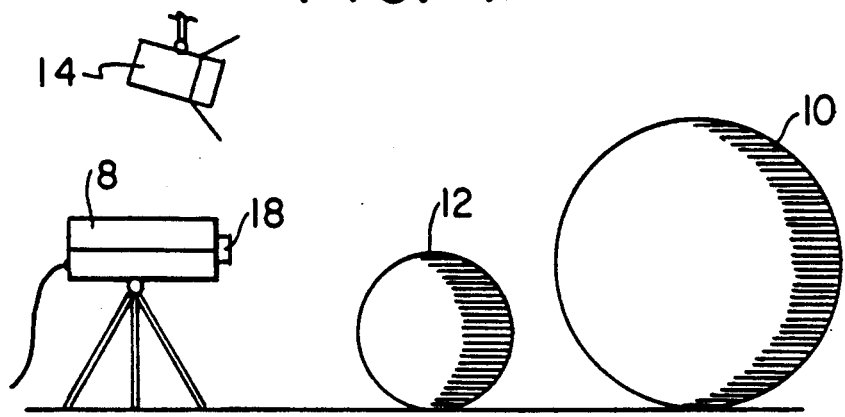
FIG. 1A is an explanatory diagram showing the side view of two smooth planar objects; one foreground and one background, and the relative position of a television camera and a stage light.

FIG. 1A shows a simplified side view of the relative position of a camera 8, a small foreground sphere 12, a large background sphere 10, and a stage light 14. The stage light is positioned such that the surfaces of the objects 10 and 12 are evenly and well lit and provide little surface detail.

Figure 1B:
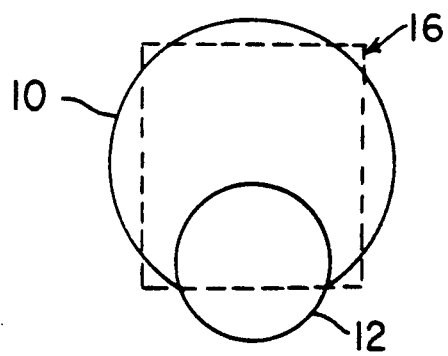
FIG. 1B shows the front view of the smooth planar objects as seen by the television camera; the camera frame boundary is represented in dashed lines.

FIG. 1B shows a front view of the objects 10 and 12. The dashed line 16 represents the portion of the objects viewed by the video camera. In this case, the objects occupy a significant portion of the camera's frame of view 16. The smaller foreground sphere 12 reveals an edge portion within the camera's view 16. This edge detail could be used in the above mentioned conventional high frequency peak detection technique and the appropriate camera lens focus position could be determined fairly easily. However, it would be difficult to focus the camera onto the surface of the larger background sphere 10 using the same high frequency detection technique, because most of the detail of the larger sphere 10 is confined to the outlying edges and lies outside the camera's frame of view 16. Therefore the camera sees a featureless background surface 10 which has little high frequency information to detect. Because the measured high frequency component is low due to the smooth featureless surface of the sphere, it is vulnerable to the harmful effects of random noise, making detection of the high frequency peak and therefore the proper focusing position of the camera lens 18 difficult to obtain.

Figure 2B:
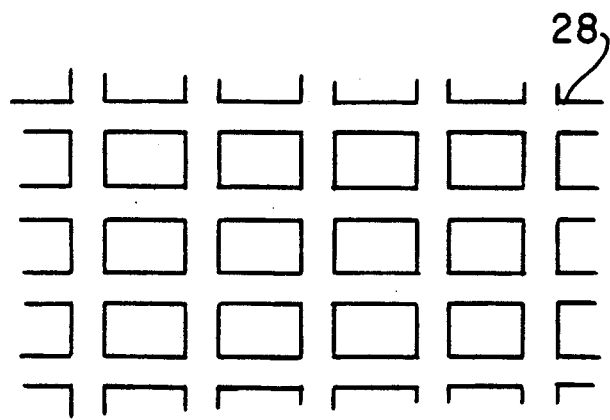
FIG. 2B shows an example of a sharp detailed projection pattern.
Figure 2A:
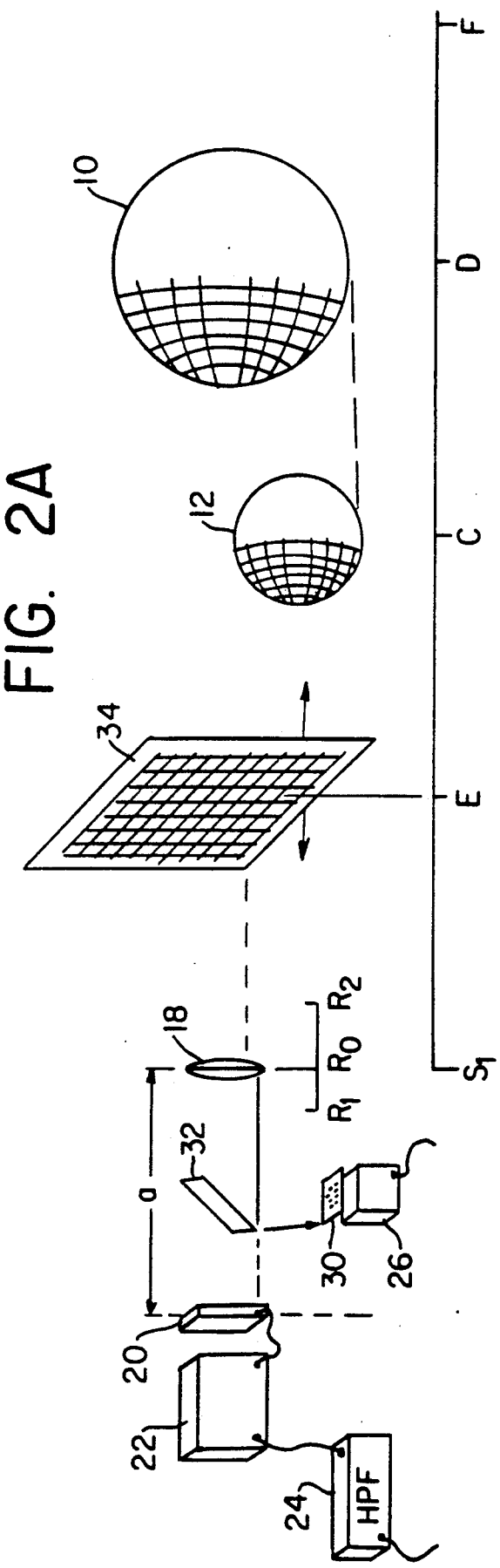
FIG. 2A is a diagrammatic view of a preferred embodiment of the invention.

FIG. 2A shows three basic parts of a television (video) camera including a lens 18, a target sensor 20 and scanning circuitry 22. A high pass filter 24 is shown attached to the output of the scanning circuitry 22. This filter will detect any high frequency peaks from the scanning circuitry 22. For purposes of explanation, the target sensor 20 and conventional scanning circuitry 22 are referred to hereinafter as video camera 8. The lens 18 can be moved linearly along the axis perpendicular to the center of the target sensor 20 in a conventional mechanical fashion. The lens movement range is shown on the scale just below the lens 18 in FIG. 2A; in this case, as marked in the figure, the lens range is from R1 to R2 and is shown at position R0.

A projector 26 projects a pattern 28, for example of the type shown in FIG. 2B, from a conventional transparency 30, up towards a beam splitter 32. The beam splitter 32 is in this case angled 45 degrees from the vertical and positioned between the lens 18 and the camera 8 so that the projected pattern 28 is reflected out through the camera lens 18 so that it can be focused onto the surface of either object 10 or 12 depending on which surface it is desired to locate. The small foreground sphere 12 can be considered to be positioned at point C and the larger background sphere 10 is at point D in FIG. 2A. For purposes of explanation, assume that it is desired to locate and identify the surface of the large background sphere 10 (point D), which is the surface that would ordinarily be difficult to recognize even when it is in focus.

There is shown in FIG. 2A a spatial focal plane 34 which is an imaginary plane located at position E between the camera and infinity. For any given lens position R0, this plane 34 is located at the plane where there is maximum camera focus. The spatial focal range as shown in FIG. 2A is from S1 (when lens 18 is at position R1) to infinity (when lens 18 is at position R2). Ideally, the lens should be adjusted so that this spatial focal plane is positioned exactly to the point of desired focus. This point would then be as in-focus with the camera as possible.

The spatial focal plane 34 has thus far been assumed to be infinitely thin. In real life, however, the spatial focal plane 34 has a finite depth referred to in photography as the depth of field (measured along the axis of movement) and if the aperture of the camera is small enough this depth of field could be infinitely thick. Since this depth varies considerably with lens position, type of lens used and aperture size, for reasons of explanation the spatial focal plane 34 shown and discussed hereinafter, will be assumed to be the point located in the middle of the depth of field at any given lens position and that the depth of field will be of sufficient depth to include the surface curvature of either sphere 12 or sphere 10 when the spatial focal plane 34 is positioned at C or D respectfully.

FIG. 2B shows an enlargement of pattern 28. It is a sharp in-focus random optical noise pattern which has been precisely focused by projector 26 onto either the spatial focal plane 34 (wherever it is located) or the object it is desired to locate. If the present invention is to be used to determine focus alone then it is not necessary to focus the pattern 28 onto the spatial focal plane 34 of the video system although if this is not done, some sensitivity of the system will be lost. If however, the present invention is to be used in connection with the spatial imaging system of U.S. Pat. No. 4,584,704, it is necessary to focus the pattern 28 onto the spatial focal plane 34 as described earlier. Hereinafter, it is assumed that the projected pattern 28 is in-focus with the spatial focal plane of the video system.

One way to insure that the pattern 28 from the projector 26 remains in focus with the spatial focal plane 34 is to use the arrangement shown in FIG. 2A. The pattern 28, as is shown in the figure, is projected through the lens 18 of the video camera 8. It will therefore always be in-focus with the spatial focal plane 34 provided the optical straight line distance along the path of the projected light measured from the pattern transparency 30 to the longitudinal center of the lens 18 is equal to the distance measured from the longitudinal center of the lens 18 to the television sensor target 20. These two distances are represented in FIG. 2A by two arrows labeled b and a respectively. With this arrangement, as the focal plane 34 is moved (using the lens 18) to a new position, the sharp optical noise pattern 28 follows, always remaining in-focus with both the spatial focal plane 34 and the video camera 8.

Since the pattern 28 is a "sharp" pattern with many edges and detail, when the camera lens 18 is positioned so that the spatial focal plane 34 is located at the background sphere's surface 10, the ensuing high frequency information detected by the camera's scanning circuitry 22 will be great. If the spatial optical plane is not located on the surface of object 10, the high frequency information provided by the detailed pattern 28 will be considered very weak by the camera's scanning circuitry 22.

Figure 3:
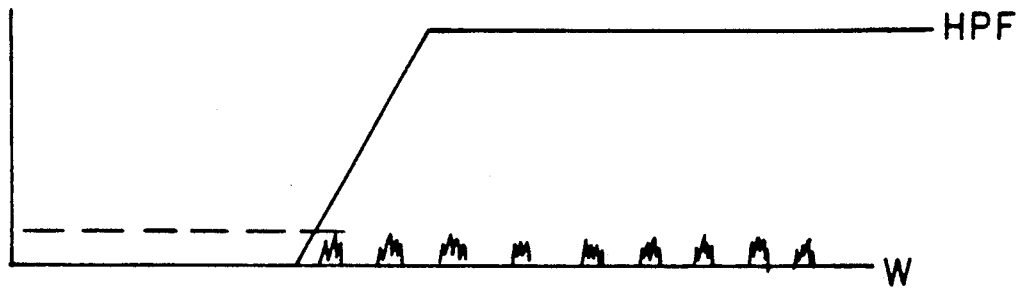
FIG. 3 shows an example of a frequency output of the high pass filter when the spatial plane is in front of and far from the focusing surface of the object.

In FIG. 2A, the camera 8 is perpendicular to the surface of the object 10 and since the spatial focal plane 34 is located in front of the surface of the object 10 (at E in the figure), the camera views the object as being out of focus and the pattern 28 appears on the surface of the object 10 as an out of focus and, therefore, featureless image. As previously discussed, featureless images yield primarily low frequencies. The camera circuitry 22 will detect a majority of low frequencies from the surface of object 10 owing to the already low frequency extent of the featureless surface of object 10 and from the additional low frequency extent of the out-of-focus projected pattern 28. An example of the frequency output of the high pass filter 24 when the spatial focal plane 34 is at position E in FIG. 2A is shown in FIG. 3. FIGS. 3 through 6 show the total high frequency output from the high pass filter.

Figure 4:
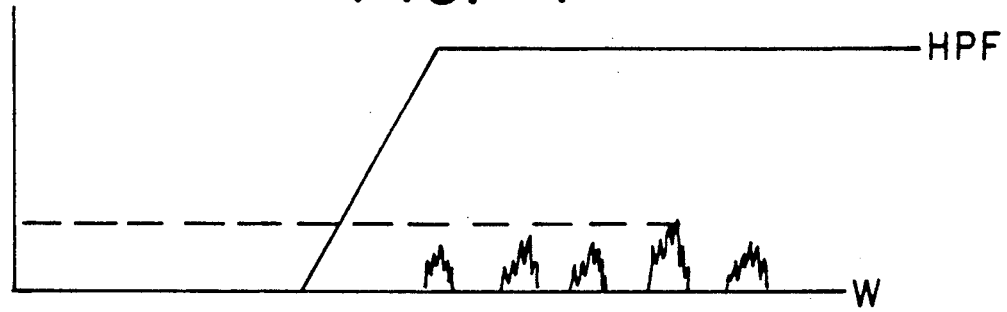
FIG. 4 shows an example of a frequency output of the high pass filter when the spatial plane is just in front of the focusing surface of the object.
Figure 5:
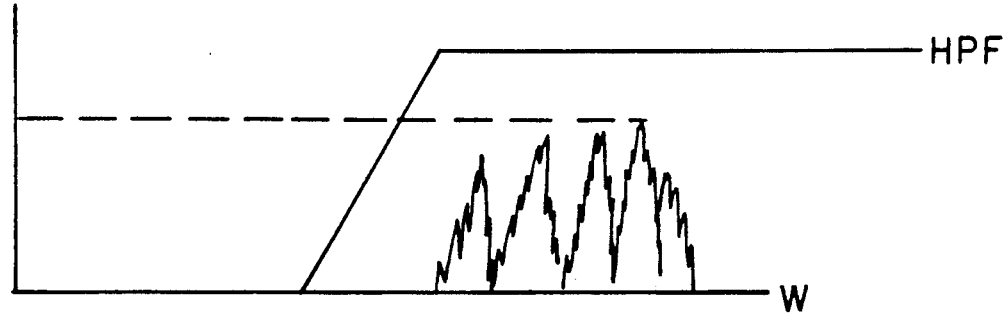
FIG. 5 shows an example of a frequency output of the high pass filter when the spatial plane lies directly on the focusing surface of the object.
Figure 6:
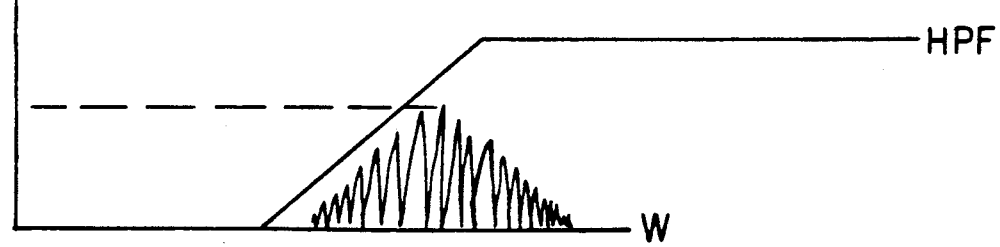
FIG. 6 shows an example of a frequency output of the high pass filter with the spatial plane behind the focusing surface of the object.

As the lens of the camera 8 is adjusted to move the spatial focal plane 34 towards the objects 10 and 12, the spatial focal plane 34 reaches C in FIG. 2A. The projected pattern 28 in this case is still not as in-focus on the object 10 as it could be, but the pattern is sharper than before and will therefore yield more total higher frequencies as is shown in FIG. 4. When the spatial focal plane 34 is positioned exactly on the surface of object 10 (at D), the high frequency component as measured by the camera's circuitry 22 will peak. This high frequency peak from the high pass filter 24 shown by FIG. 5, is an indication that with respect to the video camera 8, the sharpest focus of the surface of object 10 (C in FIG. 2A) has been achieved. Should the lens 18 be adjusted so that the spatial focal plane 34 lies behind the surface of object 10 as shown in FIG. 2A at F, the projected pattern 28 will no longer appear in focus and the high frequency component level will again drop as shown in FIG. 6.

By projecting a sharp in-focus pattern onto an object's surface the detectability of high frequencies, and therefore the ability to focus with certainty is improved due to the additional high frequency content of the projected pattern (as described above). Also, the signal to noise ratio will increase due to the "stronger" signal caused by the same projected pattern. Not only will the projected pattern yield a majority of high frequencies when a spatial focal plane is positioned on an object's surface but will also provide a majority of low frequencies when the spatial plane is either in front of or behind the object's surface thereby doubling the sensitivity of the system. The system (or camera operator) will know exactly when the object is in focus because the measured frequency output from the camera's scanning circuitry will climb from a strong low frequency value to a strong high one and eventually back down to a strong low one. Alternatively, if a high pass filter is used as in the cases above then the frequency output will be ideally zero, then some high value and then back to zero.

There are advantages to changing the natures of the projected noise patterns to suit specific applications. For example, a simple raster scanned television camera produces no object high frequency components for edges or detail which lie parallel to the scan lines. This can be a problem for prior high frequency detection systems but is correctable in the present invention through the use of an appropriate pattern. The pattern in this case would consist of short thin vertical strokes aligned perpendicular to the raster scan direction. By doing this the scanning camera picks up the high frequency detail of the thin vertical strokes which accommodate those areas of the object which lack detail in the vertical direction. These pattern strokes (also called elements) can be randomly positioned or configured to certain known patterns such as "Moire" patterns which can act as optical spatial filters allowing certain areas of an object to be influenced with more high frequency projected detail and other areas avoided. Elements configured to "Moire" patterns can therefore enhance and permit the measurement of singular object features. Other patterns, typified by Fourier derivations can satisfy other specific needs. FIG. 2B shows an arrangement of parallel and perpendicular line segments. The pattern could also be randomly generated dots or circles, all of different diameters and all in-focus. It is also suggested that these patterns be projected while in motion in order to distinguish more easily the projected pattern from any similar pattern found on the object or within the scene. It is further contemplated that color patterns be projected to further enhance edge detail.

As shown in FIG. 2A and described above, the pattern 28 as it is projected onto the object 10 shares the same lens 18 as the television camera 8 by using a conventional beam splitter 32. Two individual lenses may also be used, one for the camera and one for the projector such that each lens may be adjusted independently.

Figure 7:
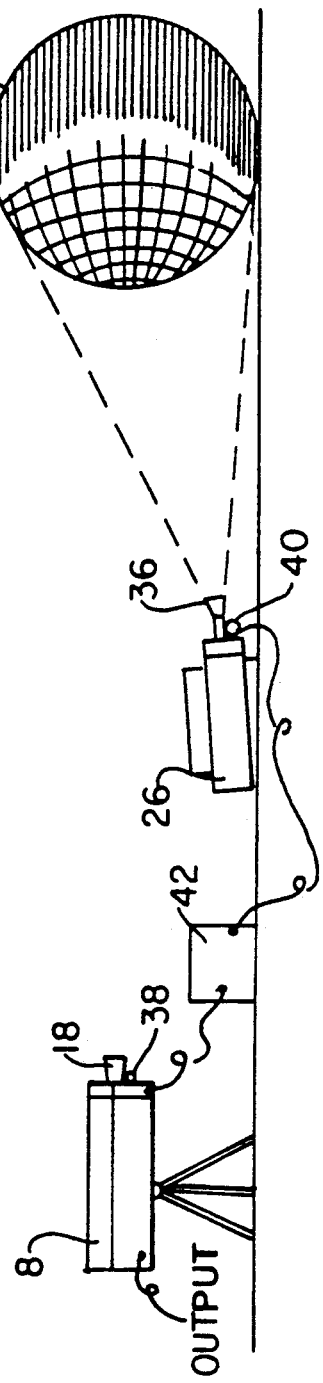
FIG. 7 shows a second embodiment of the invention for synchronizing the linear position of a television camera lens with the linear position of the lens of a projector.

The pattern can also be accommodated by its own projection system that is mechanically linked to the camera lens 18 or is co-ordinated through servo control. This latter arrangement involves the use of a servo motor and is diagrammatically shown in FIG. 7. With this set-up, the camera 8, as described earlier uses its lens 18 to focus, but now the projector 26 has its own lens 36. These lenses 18 and 36, which have identical optical characteristics are connected mechanically to a conventional servo-motor system, usually employing a potentiometer, encoder or similar transducer 38, a servo motor 40 and controlling circuitry 42. As an example, the camera lens 18 is adjusted and a linear potentiometer 38 is simultaneously rotated. The potentiometer electrically represents the position of the camera lens 18. Its electrical output is connected to conventional servo motor controlling circuitry 42. A servo motor 40 which is mechanically connected to the projector lens adjustment mechanism (not shown) can be activated such that projector lens 36 will always remain in the same relative position as camera lens 18. Adjustments can be made in the controlling circuitry 42 to allow the projector's position with respect to the object to be different from that of the camera.

With another embodiment, again a separate projector is used, but with no synchronizing communication with the camera. The camera in this case is a conventional 2 dimensional video camera using a small aperture thereby providing an infinitely thick depth of field (the camera sees everything in focus). With this arrangement, the projected pattern of narrow depth is swept through the object space. A separate frequency detector reads the ensuing frequencies to determine the shape of the object and its position in the object space.

There are also other embodiments of the present invention which involve the projection of the pattern. In the preceding description, a single pattern 28 on the surface of a transparent material 19 was used. Patterns may be on slides and sequentially selected, for example by an automatic slide changer. Pattern sequences may also be contained on a strip of film, on the surface of a transparent rotatable disk or other similar methods. More control can be obtained by generating the patterns in computer hardware and displaying these when appropriate on the face of a projection cathode ray tube, a liquid crystal light valve or a spatial light modulator.

To avoid having the projected patterns recorded along with the objects in the scene, various conventional techniques may be employed such as gating the projected pattern so that it appears only during the blanking period of the video scan. If the pattern is known and recorded it may be later subtracted from each scene using conventional video editing techniques.

I claim:

1. For use with a video camera having a lens, detecting means for determining when the focal plane of the camera is positioned at an object by detecting frequency components indicative of an in-focus sharp line on the object image, and focusing means for moving the focal plane of the camera over a range including the object, the improvement comprising:

means for projecting a preselected optical pattern onto said object to produce a defined image on the surface of said object that can be detected by said detecting means, said defined image being more readily detectable by said detecting means than the surface of said object.

2. The improvement according to claim 1, wherein said projecting means includes means for moving the focal plane of the projecting means over a range including said object, wherein both said focal planes fall substantially on the same plane in space and wherein there is further provided means for synchronously moving both said focal planes.

3. The improvement according to claim 1 or claim 2 wherein said projecting means includes a lens for moving said focal plane over said range, said lens also providing means for moving said focal plane of said camera over said range.

* * * * *